US010005561B2

(12) United States Patent
Kiebles et al.

(10) Patent No.: US 10,005,561 B2
(45) Date of Patent: Jun. 26, 2018

(54) CONTROLLING AIRCRAFT USING THRUST DIFFERENTIAL TRIM

(71) Applicant: GE Aviation Systems LLC, Grand Rapids, MI (US)

(72) Inventors: Steven Louis Kiebles, Grand Rapids, MI (US); David Michael Lax, Grand Rapids, MI (US); Otto Y Darias, Grand Rapids, MI (US); Mark Lawrence Darnell, Grand Rapids, MI (US); Sean Sanghyun Hwang, Grand Rapids, MI (US); Christopher Daniel Holbert, Lowell, MI (US); Harry Kirk Mathews, Jr., Clifton Park, NY (US); Sridhar Adibhatla, Glendale, OH (US); Jeffrey Russell Bult, Grand Rapids, MI (US); Thomas Charles Swager, Maineville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days. days.

(21) Appl. No.: 15/184,196

(22) Filed: Jun. 16, 2016

(65) Prior Publication Data
US 2017/0361941 A1 Dec. 21, 2017

(51) Int. Cl.
*B64D 31/06* (2006.01)
*G05D 1/08* (2006.01)
(Continued)

(52) U.S. Cl.
CPC ............. *B64D 31/06* (2013.01); *B64C 15/02* (2013.01); *B64D 45/00* (2013.01); *G05D 1/0808* (2013.01); *G05D 1/0816* (2013.01)

(58) Field of Classification Search
CPC ........ B64D 31/06; B64D 45/00; B64C 15/02; G05D 1/0808
See application file for complete search history.

(56) References Cited

U.S. PATENT DOCUMENTS 2,523,186 A 9/1950 Bennett
3,545,209 A 12/1970 Millward
(Continued)

FOREIGN PATENT DOCUMENTS

| EP | 0410162 A1 * | 1/1991 | ............. B64C 13/16 |
| GB | 2 172 860 A | 10/1986 | |
| WO | WO2015076888 A2 | 5/2015 | |

OTHER PUBLICATIONS

Extended European Search Report and Opinion issued in connection with corresponding EP Application No. 17176327.9 dated Oct. 27, 2017.

*Primary Examiner* — Rodney A Butler
(74) *Attorney, Agent, or Firm* — General Electric Company; William Andes

(57) ABSTRACT

Systems and methods for stabilizing an aircraft in response to a yaw movement are provided. In one embodiment, a method includes detecting a yaw movement of the aircraft. The yaw movement can cause a front portion of the aircraft to move towards a first side of the aircraft. The method can further include, in response to the yaw movement, initiating a trim process resulting in a thrust differential. The trim process can include increasing thrust in one or more engines on the first side of the aircraft and decreasing thrust in one or more engines on a second side of the aircraft. The method can include controlling the trim process based at least in part on a detected yaw movement of the aircraft.

14 Claims, 7 Drawing Sheets

(51) Int. Cl.
  *B64C 15/02* (2006.01)
  *B64D 45/00* (2006.01)

(56) References Cited

U.S. PATENT DOCUMENTS

| | | | |
|---|---|---|---|
| 4,935,682 A | 6/1990 | McCuen | |
| 4,992,713 A * | 2/1991 | McCollum | G05D 1/0808 244/17.13 |
| 5,082,204 A * | 1/1992 | Croston | B64C 39/066 244/126 |
| 5,657,949 A * | 8/1997 | Deck | B64C 13/16 244/184 |
| 5,704,568 A | 1/1998 | Watts | |
| 6,102,330 A | 8/2000 | Burken et al. | |
| 6,459,963 B1 | 10/2002 | Bennett et al. | |
| 6,860,452 B2 | 3/2005 | Bacon et al. | |
| 7,364,121 B2 | 4/2008 | Firuz et al. | |
| 7,701,161 B2 | 4/2010 | Hanlon et al. | |
| 7,759,894 B2 | 7/2010 | Marino et al. | |
| 8,016,243 B2 | 9/2011 | Beaufrere | |
| 8,352,099 B1 | 1/2013 | Eggold et al. | |
| 8,393,583 B2 | 3/2013 | Beaufrere | |
| 8,423,206 B2 | 4/2013 | Shapiro et al. | |
| 8,682,562 B2 | 3/2014 | Shepler | |
| 8,918,235 B1 | 12/2014 | Eggold et al. | |
| 8,998,131 B1 | 4/2015 | Nowlan | |
| 2009/0090817 A1 * | 4/2009 | Monka | F02K 1/1223 244/76 R |
| 2009/0187292 A1 * | 7/2009 | Hreha | B64C 13/04 701/4 |
| 2009/0261201 A1 * | 10/2009 | Stone | B23P 19/10 244/119 |
| 2010/0083669 A1 * | 4/2010 | Foster | F02C 6/18 60/802 |
| 2010/0102173 A1 | 4/2010 | Everett et al. | |
| 2011/0046823 A1 | 2/2011 | Ezerzere et al. | |
| 2013/0020432 A1 | 1/2013 | Yogev et al. | |
| 2013/0345907 A1 * | 12/2013 | Meret | G05D 1/0808 701/3 |
| 2016/0214728 A1 * | 7/2016 | Rossi | B64C 27/08 |

* cited by examiner

CONTROLLING AIRCRAFT USING THRUST DIFFERENTIAL TRIM

STATEMENT OF GOVERNMENT SPONSORED SUPPORT

This invention was made with Government support under contract DTFAWA-10-C-00046 awarded by the Federal Aviation Administration. The Government has certain rights in this invention.

FIELD

The present subject matter relates generally to aviation systems.

BACKGROUND

Traditionally, an aircraft experiencing unexpected yaw movement can correct the yaw movement using a rudder. Correcting yaw movement using the rudder can cause an increase of drag on the aircraft. An increase of drag on the aircraft can cause an increase of fuel consumption. What is needed are systems and methods for correcting yaw movement without increasing drag on an aircraft.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for controlling an aircraft in response to a yaw movement. The method includes detecting a yaw movement of the aircraft, the yaw movement causing a front portion of the aircraft to move towards a first side of the aircraft. The method includes, in response to the yaw movement, initiating a trim process resulting in a thrust differential. The trim process includes increasing thrust in one or more engines on the first side of the aircraft. The trim process includes decreasing thrust in one or more engines on a second side of the aircraft. The method includes controlling the trim process based at least in part on a detected yaw movement of the aircraft.

Another example aspect of the present disclosure is directed to a control system for stabilizing an aircraft in response to a yaw movement. The control system includes one or more processors and one or more memory devices included with the aircraft. The one or more memory devices store instructions that when executed by the one or more processors cause the one or more processors to perform operations. The operations include receiving data indicative of the yaw movement of the aircraft, the yaw movement causing a front portion of the aircraft to move towards a first side of the aircraft. The operations include a trim process resulting in a thrust differential in response to the yaw movement. The trim process includes controlling one or more engines on the first side of the aircraft to increase thrust. The trim process includes controlling one or more engines on a second side of the aircraft to decrease thrust. The operations include determining when the trim process negates the yaw movement. The operations include repeating the trim process when the trim process does not negate the yaw movement. The operations include maintaining the thrust differential when the trim process negates the yaw movement.

Other example aspects of the present disclosure are directed to systems, methods, aircrafts, avionics systems, devices, non-transitory computer-readable media for negating yaw movement of an aircraft with a thrust differential. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
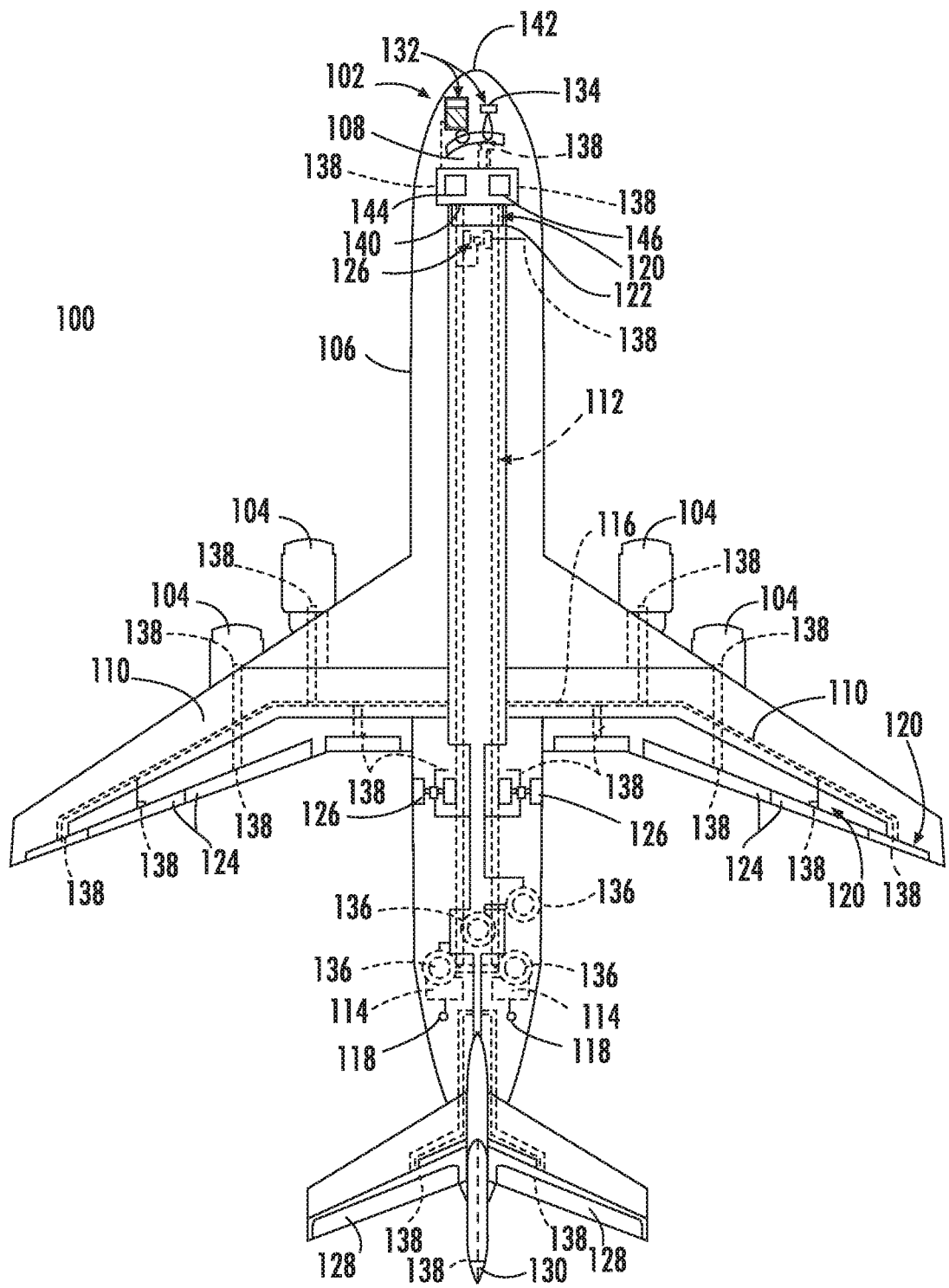
FIG. 1 depicts an example system for control system of an aircraft according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can allow an aircraft to correct unwanted yaw movement (e.g., movement to the left, movement to the right, etc.) without significantly increasing fuel consumption. Unwanted yaw movement can be regulated with a rudder. The use of a rudder, however, can increase drag on an aircraft. Increases in drag can correlate with a need to increase thrust to maintain a constant speed. Increases in thrust can correlate with increases in fuel consumption.

Methods and systems according to example embodiments of the present disclosure can detect the occurrence and direction of an unwanted yaw movement that can, for instance, cause the aircraft to move unexpectedly to the left or to the right. The yaw movement can cause the aircraft to rotate around a center of mass in the yaw direction. In response to the detected unwanted yaw movement, one or more engines on a side of the aircraft that matches the direction of the unwanted yaw movement can be controlled to increase thrust. For instance, one or more engines on the left side of the aircraft can be controlled to increase thrust in response to an unwanted yaw movement to the left. In addition, one or more engines on a side of the aircraft that does not match the direction of the unwanted yaw movement can be controlled to decrease thrust. For instance, one or more engines on the right side of the aircraft can be controlled to decrease thrust in response to an unwanted yaw movement to the left.

In particular implementations, the one or more engines on the side of the aircraft that does not match the unwanted yaw movement can be controlled to decrease thrust at the same rate of change (but in opposite direction) to a rate of change of increasing thrust of the one or more engines on the side of the aircraft that matches the unwanted yaw movement. The one or more engines on the side of the aircraft that matches the direction of unwanted yaw movement can be controlled to continue to increase thrust and the one or more engines on the side of the aircraft that does not match the direction of unwanted yaw movement can be controlled to continue to decrease thrust until there is no unwanted yaw movement.

In some embodiments, each time the aircraft experiences unwanted yaw movement, the methods and systems according to example aspects of the present disclosure can start anew. For example, when a force on the aircraft that causes the aircraft to move to the left ceases to act on the aircraft, the aircraft can experience unwanted yaw movement to the right, caused by the increased thrust from the one or more engines on the left side of the aircraft and the decreased thrust from the one or more engines on the right side of the aircraft. In this example, the engines on the left side of the aircraft can decrease thrust and the engines on the right side of the aircraft can increase thrust until the unwanted yaw movement to the right ceases.

As the thrust of the one or more engines on one side can increase at the same rate of change (but in an opposite direction) as the one or more engines on another side, the total thrust asserted by all engines of the aircraft can remain constant. By keeping the total thrust asserted by all engines of the aircraft constant, an airspeed of the aircraft can remain constant. In this way, example aspects of the present disclosure can have a technical effect of correcting for yaw movements with reduced impact on total thrust and/or fuel consumption by the aircraft.

FIG. 1 schematically depicts a system 100 for stabilizing yaw movement on an aircraft 102 (e.g., trimming the aircraft 102, eliminating the yaw movement of the aircraft 102, negating the yaw movement of the aircraft 102, canceling the yaw movement of the aircraft 102, etc.) according to example embodiments of the present disclosure. As shown, the system 100 can include an aircraft 102. The aircraft 102 can include one or more engine(s) 104 coupled to a fuselage 106, a cockpit 108 positioned in the fuselage 106, and wing assemblies 110 extending outward from the fuselage 106. A hydraulic system 112 can include a hydraulic storage tank 114 and a hydraulic circuit 116. In the illustrated example, two hydraulic storage tanks 114 have been illustrated and can be fluidly coupled to each other through the hydraulic circuit 116. A fluid sensor 118 can be operably coupled to each of the hydraulic storage tanks 114 and each can provide an output indicative of the amount of hydraulic fluid in the hydraulic storage tank 114.

The hydraulic circuit 116 can supply hydraulic fluid to hydraulic components 120 of the aircraft 102. Examples of hydraulic components 120 in the aircraft 102 can include brakes 122, flaps 124 including multiple trailing edge flaps and multiple leading edge flaps, spoilers installed forward of the trailing edge flaps 124, landing gear 126, elevators 128, rudder 130, thrust reversers, etc. A variety of control mechanisms 132 can be included in the cockpit 108 for actuation or operating such hydraulic components 120. The control mechanisms 132 can be any suitable mechanisms. By way of non-limiting example, one control mechanism 132 can include a rudder handle 134, which can be operated by a pilot to set the position of the rudder 130. The term rudder handle as used in this description is not limited to a physical handle, rather it relates to any control device used to set the position of the rudder, regardless of whether the control device is an actual handle or a button on a touch-screen user interface or control device (e.g., controller) that automatically adjusted the rudder position. One or more pumps 136 may be provided within the hydraulic circuit 116 to transfer hydraulic fluid to various portions of the aircraft 102 including the hydraulic components 120 and between the two hydraulic storage tanks 114 themselves.

A number of sensors 138 can also be included in the aircraft 102 and such sensors 138 can output any number of usable signals regarding the operation of the aircraft 102 and its various systems and components. For example, the sensors 138 can include a variety of sensors for determining the status of the hydraulic components 120 including whether the hydraulic components are in use. Further, the sensors 138 can include a variety of sensors that determine various movements of the aircraft 102 including the pitch, roll, yaw, and acceleration of the aircraft 102.

Figure 7:
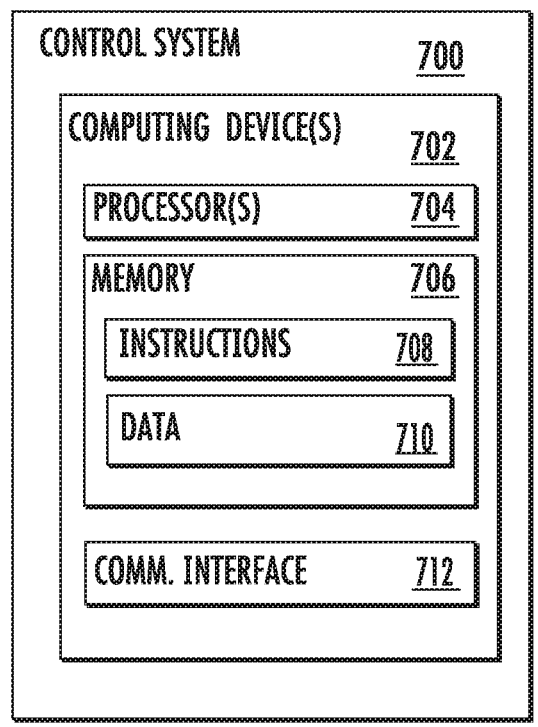
FIG. 7 depicts a computing system for implementing one or more aspects according to example embodiments of the present disclosure.

The aircraft 102 can include a controller 140 for controlling, for instance, stabilization of an aircraft during a yaw movement according to example aspects of the present disclosure. In some embodiments, the controller 140 can include one or more computing device(s), as shown in FIG. 7. The controller 140 can utilize inputs from the sensors 138 to monitor for yaw movement of the aircraft 102. The aircraft 102 can include a nose 142. Yaw movement of the aircraft 102 can cause the nose 142 of the aircraft 102 to unexpectedly move to the left or to the right. In response to detection of yaw movement of the aircraft 102, the controller 140 can cause the hydraulic system 112 to use (e.g., deploy, deflect, etc.) the rudder 130 to stabilize the aircraft 102 (e.g., trim the aircraft 102, eliminate the yaw movement of the aircraft 102, negate the yaw movement of the aircraft 102, cancel the yaw movement of the aircraft 102, etc.). For example, if the yaw movement of the aircraft 102 causes the nose 142 of the aircraft 102 to move to the left, the rudder 130 can deflect on the right side of the aircraft 102.

The controller 140 can be connected with other controllers of the aircraft 102. The controller 140 can include memory 144, the memory 144 can include random access memory (RAM), read-only memory (ROM), flash memory, or one or more different types of portable electronic memory, such as discs, DVDs, CD-ROMs, etc., or any suitable combination of these types of memory. The controller 140 can include one or more processors 146, which may be running any suitable programs.

According to example embodiments of the present disclosure, the controller 140 can cause the one or more engine(s) 104 to alter thrust to reduce the need of the rudder 130 to stabilize the aircraft 102 against yaw movement. In the example of the aircraft 102 experiencing yaw that causes the nose 142 of the aircraft to move to the left, the controller 140 and/or the computing device(s) can cause one or more of the one or more engine(s) 104 on a left wing assembly 110 to increase thrust and cause one or more of the one or more engine(s) 104 on a right wing assembly 110 to decrease thrust. This alteration of thrust can continue until the aircraft 102 is stabilized and the rudder 130 is no longer in use.

The numbers, locations, and/or orientations of the components of example system 100 are for purposes of illustration and discussion and are not intended to be limiting. Those of ordinary skill in the art, using the disclosures provided herein, shall understand that the numbers, locations, and/or orientations of the components of the system 100 can be adjusted without deviating from the scope of the present disclosure.

Figure 2:
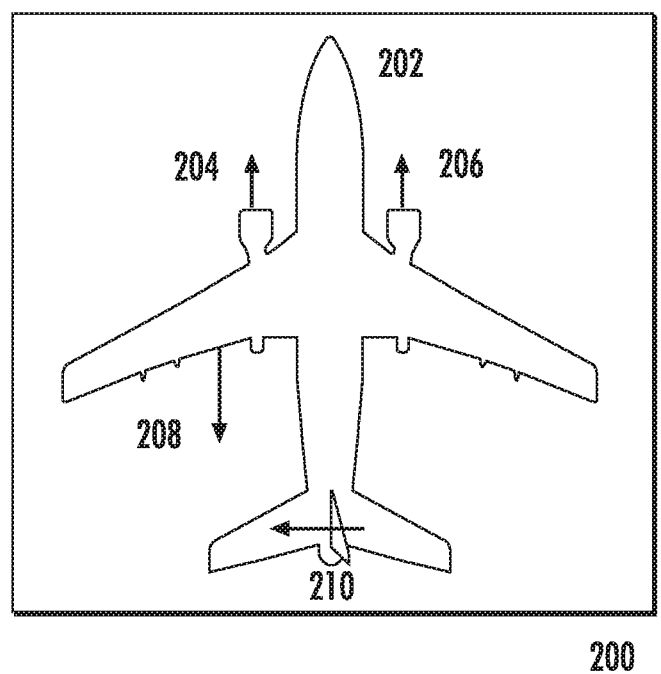
FIG. 2 depicts a free-body diagram of a system of an aircraft according to example embodiments of the present disclosure.

FIG. 2 depicts a free-body diagram 200 of an aircraft 202. The aircraft 202 can be influenced by a first force 204 created by thrust of one or more left engine(s). The aircraft 202 can be influenced by a second force 206 created by thrust of one or more right engine(s). In an aspect, the first force 204 can equal the second force 206. The first force 204 and the second force 206 can influence the ground speed of the aircraft 202.

In some circumstances, the aircraft 202 be influenced by a third force 208 created by a drag on one side of the aircraft 202. The third force 208 can, in some examples, be caused by an asymmetry on the aircraft 202. In an aspect, the third force 208 can cause yaw movement in the aircraft 202. In an aspect, the yaw movement of the aircraft 202 can cause a nose of the aircraft 202 to point towards the side of the aircraft experiencing the third force 208. For example, the third force 208 can act on a left wing assembly, causing the nose of the aircraft 202 to point towards the left. In response to the yaw movement, a deflected rudder of the aircraft 202 can implement a fourth force 210 on the aircraft. The fourth force 210 can be used to negate the yaw movement caused by the third force 208. For example, the fourth force 210 can deflect to the right to negate yaw movement to the left. The third force 208 and the fourth force 210 can cause the ground speed of the aircraft 202 to decrease. The third force 208 and the fourth force 210 can also cause the aircraft 202 to expend more fuel to maintain the same ground speed.

Figure 3:
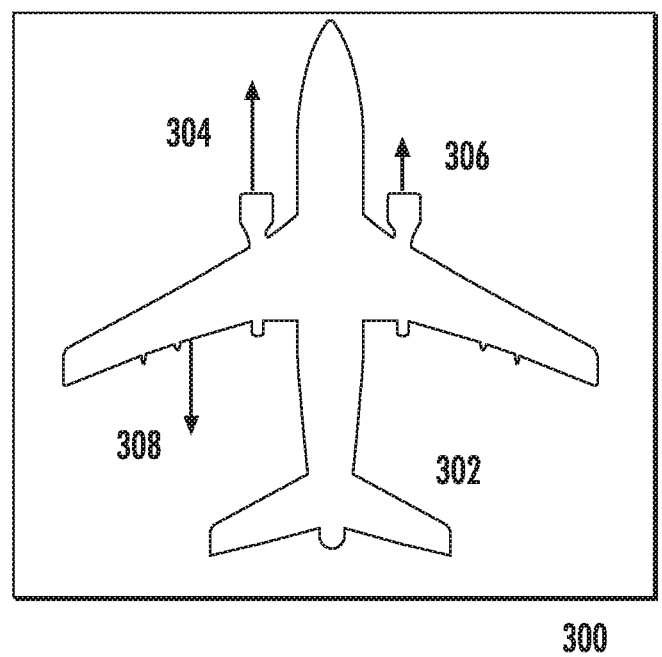
FIG. 3 depicts a free-body diagram of a system of an aircraft according to example embodiments of the present disclosure.

FIG. 3 depicts a free-body diagram 300 of an aircraft 302. The aircraft 302 can be influenced by a first force 304 created by thrust of one or more left engine(s). The aircraft 302 can be influenced by a second force 306 created by thrust of one or more right engine(s). The aircraft 302 be influenced by a third force 308 (e.g., created by asymmetrical drag) on one side of the aircraft 302. The third force 308 can cause yaw movement in the aircraft 302. The yaw movement of the aircraft 302 can cause a nose of the aircraft 302 to point towards the side of the aircraft experiencing the third force 308. For example, the third force 308 can act on a left wing assembly, causing the nose of the aircraft 302 to point toward the left. According to aspects of the present disclosure. The thrust of the engines of the aircraft 302 can be controlled to alter the first force 304 and the second force 306 to negate yaw movement on the aircraft 302 created by the third force 308. In one example, the first force 304 can increase and the second force 306 can decrease. The first force 304 can increase by a magnitude and the second force 306 can decrease by the same magnitude. Increasing the first force 304 and decreasing the second force 306 can negate the yaw movement of the aircraft 302 without increasing drag on the aircraft 302.

Figure 4:
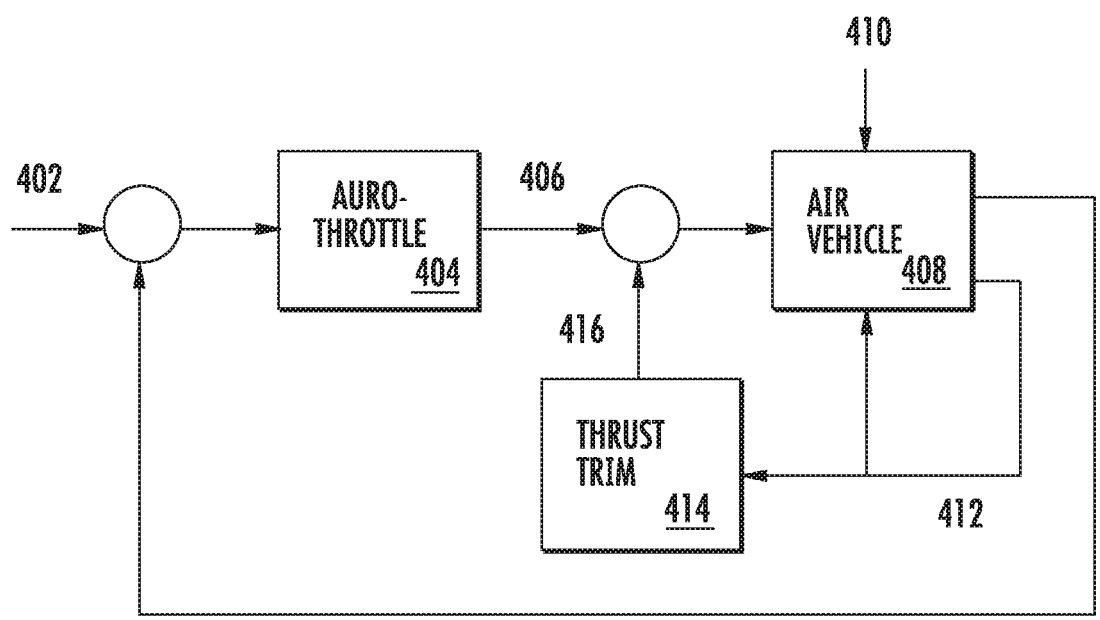
FIG. 4 depicts a control scheme implementable by a controller of an aircraft according to example embodiments of the present disclosure.

FIG. 4 depicts a control scheme 400 implementable by a controller of an aircraft according to example embodiments of the present disclosure. A command 402 to engage an auto-throttle system 404 can be received. In some embodiments, the command 402 can be based on a throttle lever angle. In an aspect, the auto-throttle system 404 can be used to maintain a target speed based on the command 402. In an aspect, the auto-throttle system 404 can be used to maintain a target thrust. For instance, in one embodiment, the auto-throttle system 404 can determine a throttle resolver angle 406 based on the command 402. The throttle resolver angle 406 can determine the thrust of an aircraft 408.

The aircraft 408 can experience a force of asymmetrical drag causing yaw movement on the aircraft 408. One or more systems of the aircraft 408 can detect the force of asymmetrical drag. The one or more systems of the aircraft 408 can produce a signal 410 indicative of the force of asymmetrical drag. The one or more systems of the aircraft 408 producing the signal 410 can include one or more yaw movement sensors. The yaw movement on the aircraft 408 can cause a nose of the aircraft 408 to move towards one side. A rudder can be deflected at an angle 412 to negate the yaw movement on the aircraft 408. The rudder angle 412 can be received at a thrust trim system 414. The thrust trim system 414 can estimate (e.g., calculate, determine, resolve, adjust, etc.) a throttle resolver angle change 416 based on the rudder angle 412. The throttle resolver angle change 416 can be added to the throttle resolver angle 406 sent to one or more engine(s) on the side that the yaw movement causes the nose of the aircraft to move to provide an increase in thrust. The throttle resolver angle change 416 can be subtracted from the throttle resolver angle 406 sent to one or more engine(s) on the other side of the aircraft to provide a decrease in thrust.

After the engines adjust their thrust based on the throttle resolver angle change 416, the thrust trim system 414 can once again receive the rudder angle 412. If the rudder angle 412 is not zero degrees (or within a threshold amount of zero degrees), then a new throttle resolver angle change 416 can be estimated. The threshold amount can be, for example, a number of degrees and/or a fraction of a degree. If the rudder angle 412 is zero degrees (or within a threshold amount of zero degrees), then the thrust trim system 414 can keep the throttle resolver angle change 416 constant. When the thrust trim system 414 receives a rudder angle 412 other than zero degrees (or within a threshold amount of zero degrees), the thrust trim system 414 can estimate another throttle resolver angle change 416. If the auto-throttle system 404 is instructed to maintain a target speed and the aircraft 408 is no longer at the target speed, then the auto-throttle system 404 can adjust the throttle resolver angle 406. If adjustments to the throttle resolver angle 406 cause the rudder angle 412 to be something other than zero degrees (or within a threshold amount of zero degrees), then the thrust trim system 414 can estimate a new throttle resolver angle change 416.

In some embodiments, the thrust trim system 414 can be configured to act slowly, or at a slow time constant. In such embodiments, the thrust trim system 414 can require a prolonged rudder angle 412 indicating rudder deflection before estimating a throttle resolver angle change 416. Configuring the thrust trim system 414 to act slowly, or at a slow time constant, can help prevent the thrust trim system 414 from interfering with other systems of the aircraft 408. For example, the thrust trim system 414 can alter the speed of the aircraft 408 from the target speed of the command 402. If the thrust trim system 414 were changing the throttle resolver angle change 416 at the same rate as the autopilot system changing the thrust to account for speed change from the thrust trim system 414, then the two systems could prevent each other from reaching a desired state. Additionally, configuring the thrust trim system 414 to act slowly, or at a slow time constant, helps the thrust trim system 414 to react to drag that is more than transient. For example, drag that is transient can end before the thrust trim system estimates the throttle resolver angle change 416. Additionally, the thrust trim system 414 can use more fuel to correct for transient drag than the fuel that is saved using the throttle resolver angle change 416.

Figure 5:
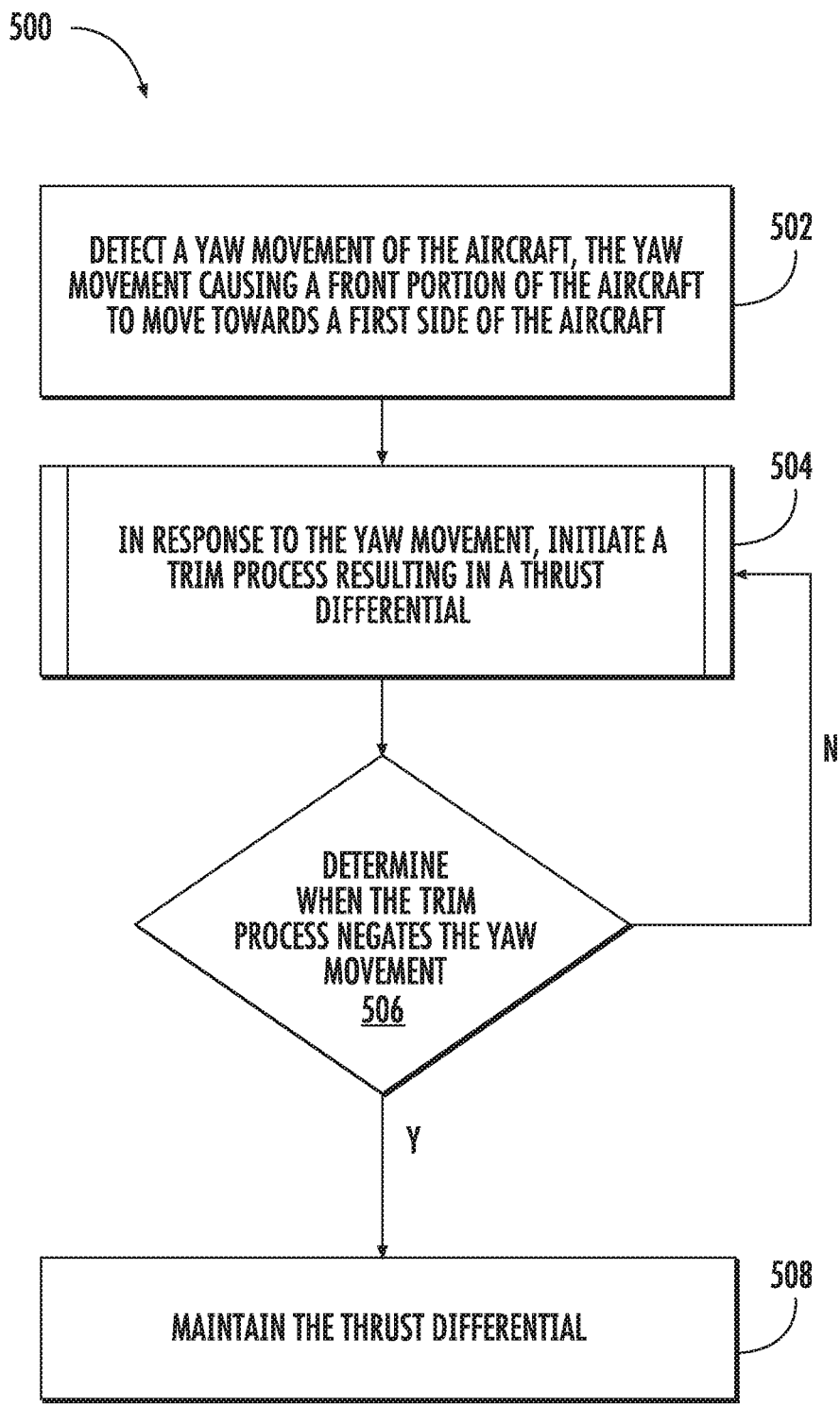
FIG. 5 depicts a flow diagram of an example method according to example embodiments of the present disclosure.

FIG. 5 depicts a flow diagram of an example method (500) for controlling an aircraft in response to a yaw movement according to example embodiments of the present disclosure. FIG. 5 depicts steps performed in a particular order for purposes of illustration and discussion. Those of ordinary skill in the art, using the disclosures provided herein, will understand that the various steps of any of the methods disclosed herein can be adapted, omitted, rearranged, expanded or modified in various ways without deviating from the scope of the present disclosure.

At (502), a yaw movement of the aircraft can be detected. The yaw movement can cause a front portion (e.g., nose, tip, etc.) of the aircraft to move towards a first side of the aircraft. The yaw movement can cause the aircraft to rotate around a center of mass in the yaw direction. The yaw movement of the aircraft can be detected by receiving data indicative of the yaw movement of the aircraft.

For example, in some embodiments, the data indicative of the yaw movement of the aircraft can include data indicating a deviation from a flight plan. In some embodiments, the data indicative of the yaw movement of the aircraft can include data indicating a deviation from a flight plan by a predefined threshold. In some embodiments, the data indicative of the yaw movement of the aircraft can include data indicating non-responsiveness of one or more controls. In some embodiments, the data indicative of the yaw movement of the aircraft can include data indicating a rudder deflection. In some embodiments, detecting the yaw movement of the aircraft can include detecting that a rudder is deflected. In some embodiments, detecting the yaw movement of the aircraft can include detecting non-responsiveness of one or more controls. In some embodiments, detecting the yaw movement of the aircraft can include detecting a disruption in one or more engines on the first side of the aircraft. The disruption can be in response to foreign object damage (FOD). FOD can be caused by, for example, a bird strike, ice accumulation and shedding, engine deterioration, etc. In some embodiments, detecting the yaw movement of the aircraft can include receiving first yaw movement data via one or more yaw movement sensors.

Figure 6:
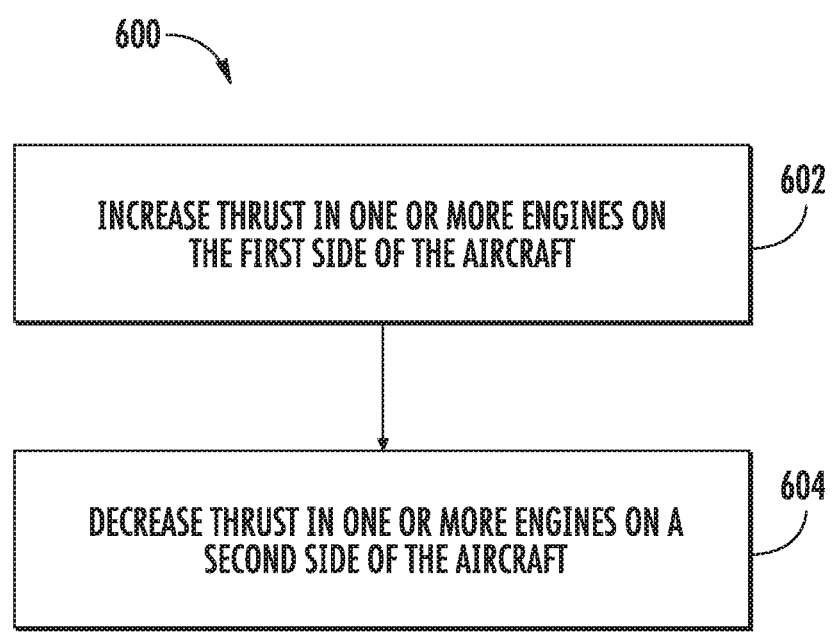
FIG. 6 depicts a flow diagram of an example sub-method according to example embodiments of the present disclosure.

At (504), in response to the yaw movement, a trim process resulting in a thrust differential can be initiated. In some embodiments, the trim process can be performed without regard to rudder deflection. For example, the yaw movement can be not significant enough to cause a rudder deflection, but can be detected by the one or more yaw movement sensors. FIG. 6 depicts a flow diagram of an example sub-method (600) for executing the trim process in (504) of FIG. 5 according to example embodiments of the present disclosure. At (602), the trim process can include increasing thrust in one or more engines on the first side of the aircraft. At (604), the trim process can include decreasing thrust in one or more engines on a second side of the aircraft. The increase of thrust in the one or more engines on the first side of the aircraft can equal to the decrease of thrust in the one or more engines on the second side of the aircraft. In an aspect, the increase of thrust in the one or more engines on the first side of the aircraft can equal to the decrease of thrust in the one or more engines on the second side of the aircraft so that a total thrust can be maintained. The total thrust can be the same as a thrust requested by an autothrottle. Maintaining the total thrust as the thrust requested by the autothrottle can maintain airspeed. In an aspect, the trim process does not alter a drag on the aircraft. In an aspect, the trim process does not increase a drag on the aircraft. In an aspect, the trim process does not alter a fuel consumption rate of the aircraft. In an aspect, the trim process does not increase a fuel consumption rate of the aircraft. In an aspect, the trim process does not alter a speed of the aircraft. The trim process can execute as a normal part of operation. The trim process can execute when the aircraft is in a cruising state.

Turning back to FIG. 5, at (506) a determination of when the trim process negates the yaw movement can be made. In some embodiments, determining when the trim process negates the yaw movement can include determining when a rudder angle is zero degrees (or within a threshold amount of zero degrees). In some embodiments, determining when the trim process negates the yaw movement can include receiving second yaw movement data via the one or more yaw movement sensors. In one example embodiment, the second yaw movement data can indicate no yaw movement or yaw movement below a threshold. When the trim process does not negate the yaw movement, the method (500) can return to (504) and repeat the trim process.

When the trim process negates the yaw movement, the method (500) can proceed to (508) and maintain the thrust differential. A drag on the aircraft while the thrust differential is maintained can be generally consistent with or lower than a drag on the aircraft prior to the trim process. In an aspect, if the drag on the aircraft during the trim process ("a second drag") is within 35% of the drag on the aircraft prior to the trim process ("a first drag"), the second drag can be said to be generally consistent with the first drag.

A rate of fuel consumption while the thrust differential is maintained can be generally consistent with or lower than a rate of fuel consumption prior to the trim process. In an aspect, if the rate of fuel consumption during the trim process ("a second rate of fuel consumption") is within 35% of the rate of fuel consumption to the trim process ("a first rate of fuel consumption"), the second rate of fuel consumption can be said to be generally consistent with the first rate of fuel consumption.

Optionally, data indicating that a force causing the yaw movement has ceased to act on the aircraft can be received. The thrust differential can cease to be maintained in response to detecting that the force causing the yaw movement has ceased to act on the aircraft. A drag on the aircraft after the thrust differential is ceased to be maintained can be generally consistent with a drag on the aircraft while the thrust differential is maintained. A rate of fuel consumption after the thrust differential is ceased to be maintained can be generally consistent with the rate of fuel consumption while the thrust differential is maintained.

FIG. 7 depicts a block diagram of an example computing system that can be used to implement the control system 700 or other systems of the aircraft according to example embodiments of the present disclosure. As shown, the control system 700 can include one or more computing device(s) 702. The one or more computing device(s) 702 can include one or more processor(s) 704 and one or more memory device(s) 706. The one or more processor(s) 704 can include any suitable processing device, such as a microprocessor, microcontroller, integrated circuit, logic device, or other suitable processing device. The one or more memory device(s) 706 can include one or more computer-readable media, including, but not limited to, non-transitory computer-readable media, RAM, ROM, hard drives, flash drives, or other memory devices.

The one or more memory device(s) 706 can store information accessible by the one or more processor(s) 704, including computer-readable instructions 708 that can be executed by the one or more processor(s) 704. The instructions 708 can be any set of instructions that when executed by the one or more processor(s) 704, cause the one or more processor(s) 704 to perform operations. The instructions 708 can be software written in any suitable programming language or can be implemented in hardware. In some embodiments, the instructions 708 can be executed by the one or more processor(s) 704 to cause the one or more processor(s) 704 to perform operations, such as the operations for negating yaw movement of the aircraft, as described with reference to FIG. 5, and/or any other operations or functions of the one or more computing device(s) 702.

The memory device(s) 706 can further store data 710 that can be accessed by the processors 704. For example, the data 710 can include a navigational database, data associated with the navigation system(s), data associated with the control mechanisms 132, data indicative of a flight plan associated with the aircraft 102, data associated with hydraulic components 120, such as the rudder 130, and/or any other data associated with aircraft 102, as described herein. The data 710 can include one or more table(s), function(s), algorithm(s), model(s), equation(s), etc. for determining yaw movement of the aircraft 102 according to example embodiments of the present disclosure.

The one or more computing device(s) 702 can also include a communication interface 712 used to communicate, for example, with the other components of system. The communication interface 712 can include components for communicating with a user, such as an output device for outputting display, audio, and/or tactile information to the user. The communication interface 712 can include any suitable components for interfacing with one or more network(s), including for example, transmitters, receivers, ports, controllers, antennas, or other suitable components.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft comprising:
   one or more first engines located on a first side of the aircraft;
   one or more second engines located on a second side of the aircraft;
   a rudder;
   a computing system comprising one or more processors and one or more memory devices located on the aircraft, the one or more memory devices storing instructions that when executed by the one or more processors cause the one or more processors to perform operations comprising:
      detecting a rudder deflection on a first side of the aircraft; and
      performing a trim process in response to the rudder deflection, the trim process comprising:
         determining an angle of the rudder;
         controlling one or more of the one or more first engines to increase thrust;
         controlling one or more of the one or more second engines to decrease thrust; and
         repeating the trim process when the angle of the rudder is not within a threshold amount of zero degrees.

2. A method for controlling an aircraft in response to a yaw movement comprising:
   detecting a yaw movement of the aircraft, the yaw movement causing a front portion of the aircraft to move towards a first side of the aircraft;
   in response to the yaw movement, initiating a trim process resulting in a thrust differential, the trim process comprising:
      increasing thrust in one or more engines on the first side of the aircraft; and
      decreasing thrust in one or more engines on a second side of the aircraft; and
   controlling the trim process based at least in part on a detected yaw movement of the aircraft,
   wherein controlling the trim process based at least in part on a detected yaw movement comprises:
      determining when the trim process negates the yaw movement;
      repeating the trim process when the trim process does not negate the yaw movement; and
      maintaining the thrust differential when the trim process negates the yaw movement, and
   wherein a drag on the aircraft during the trim process is generally consistent with or lower than a drag on the aircraft prior to the trim process.

3. The method of claim 2, wherein detecting the yaw movement of the aircraft comprises detecting that a rudder is deflected.

4. The method of claim 2, wherein the determining when the trim process negates the yaw movement comprises determining when a rudder angle is within a threshold amount of zero degrees.

5. The method of claim 2, wherein a rate of fuel consumption while the thrust differential is maintained is generally consistent with or lower than a rate of fuel consumption prior to the trim process.

6. The method of claim 2, wherein the increase of thrust in the one or more engines on the first side of the aircraft is equal to the decrease of thrust in the one or more engines on the second side of the aircraft.

7. The method of claim 2, wherein detecting the yaw movement of the aircraft comprises detecting that the aircraft has deviated from a flight plan by a threshold.

8. The method of claim 2, wherein detecting the yaw movement of the aircraft comprises detecting non-responsiveness of one or more controls.

9. The method of claim 2, wherein detecting the yaw movement of the aircraft comprises detecting a disruption in one or more of the one or more engines on the first side.

10. The method of claim 9, wherein the disruption is in response to foreign object damage (FOD).

11. The method of claim 2, wherein detecting the yaw movement of the aircraft comprises receiving first yaw movement data via one or more yaw movement sensors.

12. The method of claim 11, wherein determining when the trim process negates the yaw movement comprises receiving second yaw movement data via the one or more yaw movement sensors.

13. A method for controlling an aircraft in response to a yaw movement comprising:
   detecting a yaw movement of the aircraft, the yaw movement causing a front portion of the aircraft to move towards a first side of the aircraft;
   in response to the yaw movement, initiating a trim process resulting in a thrust differential, the trim process comprising:
      increasing thrust in one or more engines on the first side of the aircraft; and
      decreasing thrust in one or more engines on a second side of the aircraft; and
   controlling the trim process based at least in part on a detected yaw movement of the aircraft,
   wherein controlling the trim process based at least in part on a detected yaw movement of the aircraft:
   detecting that a force causing the yaw movement has ceased to act on the aircraft; and
   ceasing to maintain the thrust differential in response to detecting that the force causing the yaw movement has ceased to act on the aircraft, and
   wherein a rate of fuel consumption after the thrust differential is ceased to be maintained is generally consistent with the rate of fuel consumption while the thrust differential is maintained.

14. The method of claim 13, wherein a drag on the aircraft after the thrust differential is ceased to be maintained is generally consistent with a drag on the aircraft while the thrust differential is maintained.

* * * * *